Nov. 4, 1958 W. L. FIRESTONE ET AL 2,859,346

CRYSTAL OSCILLATOR

Filed July 28, 1954

INVENTORS
William L. Firestone
Thomas L. Leming
BY Mueller & Aichele
Attys.

United States Patent Office 2,859,346

Patented Nov. 4, 1958

2,859,346

CRYSTAL OSCILLATOR

William L. Firestone, Chicago, Ill., and Thomas L. Leming, Redwood City, Calif., assignors to Motorola, Inc., Chicago, Ill., a corporation of Illinois Application July 28, 1954, Serial No. 446,274

3 Claims. (Cl. 250—36)

The present invention relates generally to oscillator circuits, and more particularly to a crystal controlled oscillator which produces a signal of comparatively stable low frequency in the presence of conditions ordinarily producing frequency changes.

Crystal controlled oscillator circuits have been found to be essential for many applications where accurate frequency control is required. There are certain disadvantages to such circuits however, when used for some purposes. For example it has been found that changes in temperature, aging of the components, changes in circuit voltages and the like produce highly undesirable shifts in signal frequency. Among the various methods which have been proposed to prevent frequency change due to these causes are the use of heating means to maintain the component at a constant temperature, voltage regulation to maintain constant circuit potentials and the like. However, such devices are relatively expensive, may not maintain stability to the desired degree, and of course, tend to correct for the influence of one factor only. Furthermore it is at the present time somewhat difficult to provide crystal control for low frequency oscillators since structural problems arise in the use of vibrating crystals at the lower frequencies. For example an A. T. cut crystal vibrating in the shear mode at a frequency under 100 kilocycles would be around an inch thick and would have to be several feet across to minimize other modes of vibration.

An object of the present invention is to provide an improved, stable, low frequency crystal controlled oscillator which is of simple and inexpensive construction.

A further object is to provide an improved source of oscillation which produces a signal of comparatively stable frequency with the effects of variations in physical conditions being balanced out in the output oscillations.

A feature of the invention is the provision of an oscillator including a pair of oscillator sections which develop signals differing by a selected frequency and both controlled by a single crystal, with the outputs of the two sections being heterodyned to provide a stable difference frequency.

Another feature of the invention is the provision of an oscillator including a pair of oscillator sections both controlled by a single crystal, with the crystal having two portions of different dimensions individually coupled to the oscillator sections so that each section is held at a different frequency by the crystal. The crystal portions may be provided by crystal parts of different dimensions, or by electrodes of different dimensions. Further objects, features and the attending advantages thereof will be apparent upon consideration of the following description when taken in conjunction with the accompanying drawings in which:

In practicing the invention there is provided a crystal controlled oscillator including a pair of electron discharge devices each connected in an oscillator circuit section, with a single crystal controlling the frequency of both sections. Portions of the crystal are arranged to vibrate at two different selected frequencies so that the oscillators produce a pair of signals at frequencies which may be heterodyned to develop a difference frequency for utilization. Operation of portions of the crystal at different frequencies may be provided by providing portions having different thicknesses, or by the use of electrodes having different thicknesses or areas. The difference frequency provided will not be effected in any great degree by aging of the components of the oscillators, temperature changes, and the like, since these changes will occur simultaneously and in approximately equal amounts in both oscillator circuits and will therefore be balanced out in the difference.

Figure 1:
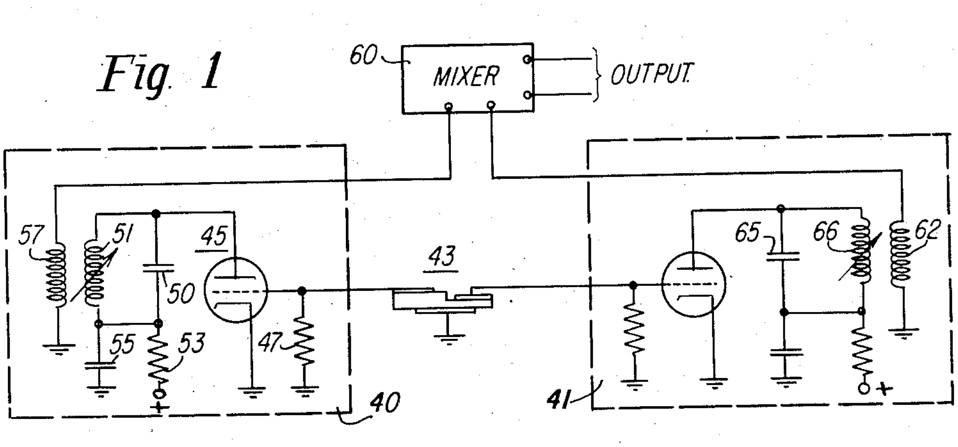
Fig. 1 is a schematic representation of an oscillator circuit constructed in accordance with the present invention.

In the circuit of Fig. 1 it may be seen that there is a pair of oscillator sections 40 and 41, including electron valves the grid circuits of which are both controlled by the single crystal 43. This crystal may be constructed and vibrated in accordance with the description to be given presently so that each half presents an inductive reactance to the associated oscillator section to obtain maximum stability.

Oscillator sections 40 and 41, are similar in circuitry and only section 40 will be described in detail. This circuit includes electron valve 45 with a grounded cathode and a grid leak resistor 47. The plate circuit of this oscillator is tuned by capacitor 50 and inductor 51. The plate voltage is supplied through resistor 53 in series with the tuned circuit, and capacitor 55 bypasses oscillations to ground to prevent their entering the voltage supply. Inductively coupled to inductor 51 is output coil 57 which is connected to a suitable mixing device 60. The oscillator 41 also has an output coil 62 which is connected to this mixer. The tuned circuit consisting of capacitor 65 and inductor 66 of oscillator 41 is resonant at a frequency which differs by a selected amount from that of the resonant circuit 50, 51. The difference in resonant frequency of these two circuits corresponds to the difference of vibratory frequency of the two valves of crystal 43. Therefore, oscillator sections 40 and 41 may oscillate at different frequencies which are both controlled by the single crystal 43, and their outputs heterodyned in the mixer 60 to produce a selected low frequency signal at the output terminals of this mixer.

Figure 2:
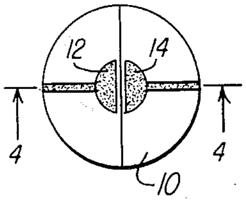
Fig. 2 is a view of one side of a plated crystal blank.
Figure 3:
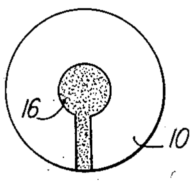
Fig. 3 is a view of the other side of a plated crystal blank.

Turning now to construction of the crystal, Fig. 2 is a plan view of one side of a crystal blank 10. This may consists of an A. T. cut piezo-electric crystal and includes a pair of spaced electrodes 12 and 14 on the surface thereof. These electrodes may be suitably etched or plated silver as is customary in the construction of such crystal devices, and should be spaced by a substantial amount to reduce the capacity therebetween to prevent undesired interaction between the halves. In Fig. 3 is illustrated the other side of such a crystal blank and shows an additional electrode 16 which may be affixed to this side of the crystal blank in a similar manner.

Figure 4:
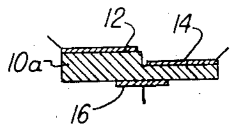
Fig. 4 is a sectional view along the line 4—4 of Fig. 2.
Figure 5:
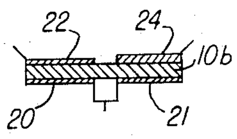
Fig. 5 is a sectional view of an alternate construction of a crystal.

Figs. 4 and 5 illustrate different constructions to permit different halves of the crystal blank 10 to vibrate at different frequencies simultaneously. The cross-sectional view of Fig. 4 is taken along line 4—4 of Fig. 2 and shows that the thickness of the blank 10*a* is changed by a selected amount along a diameter thereof. It may be seen that electrode 12 is spaced from the bottom electrode 16 by a greater thickness of crystal than is the electrode 14 spaced from this electrode. It has been demonstrated experimentally that if such a crystal blank is operated in the shear mode of vibration that the two halves of this crystal may be vibrated at different frequencies simultaneously.

Fig. 5 is also a cross-sectional view of a crystal blank 10*b* but in this construction the crystal is of constant thickness and the bottom electrodes 20 and 21 are spaced from the pair of top electrodes 22 and 24 by equal amounts. However, electrode 24 is somewhat thicker than electrode 22, and again as this crystal blank is operated in a shear mode of vibration, the two halves thereof may vibrate at differing frequencies. It is noted that in Fig. 5, the single lower electrode is replaced by two separate platings 20 and 21 which are electrically interconnected. This helps minimize capacitive coupling effects and can be used in the prior embodiments in place of the single electrode 16.

It is also possible to utilize a crystal of uniform thickness and having electrodes of the same dimensions in the circuit of Fig. 1. The two oscillator sections would then be tuned to different frequencies by the resonant circuits 50, 51 and 65, 66. In this case the crystal would be warped or forced to vibrate at two different frequencies simultaneously, thus providing a stable output at two different frequencies. The mixer output would then be a very stable low frequency wave.

Figure 6:
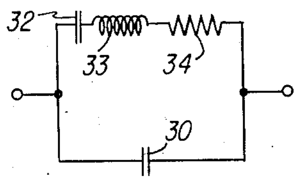
Fig. 6 is a schematic representation of the electrical equivalent of a piezo-electric crystal.
Figure 7:
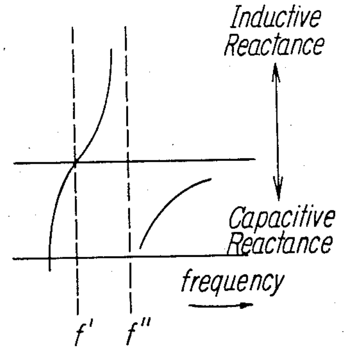
Fig. 7 is a graph illustrating the variation of reactance of the circuit of Fig. 6 as the applied frequency is varied.

As is known in the crystal art, a piezo-electric crystal may be electrically represented by the schematic diagram of Fig. 6. This includes capacitor 30 which represents the crystal holder capacitance in shunt with a series combination of capacitor 32, inductor 33 and resistor 34. These components represent, respectively, compliance, mass, and friction of the crystal. When the reactance of a circuit of this description is plotted against frequency, the result may be represented by the diagram of Fig. 7. Here it is apparent that the series resonant frequency $f'$ is spaced from the parallel resonant frequency $f''$ by an amount determined by the values of the various components in the schematic represnetation.

It is also known that the stability of an oscillator which is tuned by a resonant circuit is determined by the L:C ratio and that the higher the ratio, the greater the resulting stability. Therefore, if an oscillator is controlled in frequency by a device operating in the range between $f'$ and $f''$ in the diagram of Fig. 7 and particularly if the frequency of operation is close to $f''$ this ratio will be quite large and the stability of an oscillator controlled by such a device will be very good. It is proposed to utilize this region of operation, namely that between $f'$ and $f''$ (Fig. 7) in the oscillator circuit of Fig. 1 in order to produce the best possible stability.

It is noteworthy that the output signal produced by the use of the above described crystal in the circuit of Fig. 1 will be very stable since slight changes in temperature of the circuit components, aging of these components, and other factors tending to cause frequency drift will occur in approximately equal degree to both oscillator sections 40 and 41 as well as crystal 43 so that changes will be largely cancelled out. Furthermore the oscillator sections may be operated at frequencies close to one another so that the heterodyned signal is a crystal controlled signal of low frequency. This oscillator circuit therefore provides a simple and inexpensive source of stable low frequency oscillation.

While a particular embodiment of the invention has been shown and described, changes may be made and it is intended to cover all such changes and modifications as fall within the scope of the invention in the appended claims.

What is claimed is:

1. An oscillator system including in combination, a piezo-electric device including a single crystal supported in shear mode of vibration and having first and second portions, said first and second portions each having an electrode individual thereto and said device having electrode means common to the two portions thereof with said electrodes and said portions forming an assembly with a varied cross-sectional thickness to provide different frequency responses at said individual electrodes of said piezo-electric device, first and second oscillator circuit portions each having an electron discharge device with input and output elements, and a tuned circuit connected to said output elements, said tuned circuits of said first and second oscillator circuit portions being resonant at particular frequencies differing by a selected amount, and means individually connecting said individual electrodes of said first and second portions of said piezo-electric device to said input elements of said discharge devices, said oscillator circuit portions being entirely independent of each other, whereby oscillations of different frequencies controlled by said piezo-electric device are simultaneously produced individually in said oscillator circuit portions, and signal mixing means coupled to said oscillator circuit portions for producing oscillations at the difference frequency between the frequencies of the oscillations in said oscillator circuit portions.

2. An oscillator system in accordance with claim 1 wherein said first and second portions of said crystal are of different thickness.

3. An oscillator system in accordance with claim 1, wherein said electrodes individual to said first and second crystal portions are of different thickness.

References Cited in the file of this patent

UNITED STATES PATENTS

| | | |
|---|---|---|
| 1,717,451 | Hund | June 18, 1929 |
| 1,780,229 | Green | Nov. 4, 1930 |
| 2,375,527 | Crosby | May 8, 1945 |
| 2,501,591 | Bach | Mar. 21, 1950 |